April 6, 1965   H. R. BILLETER   3,177,043
BRAKE CYLINDER RELEASE VALVES
Filed Nov. 29, 1963   2 Sheets-Sheet 1
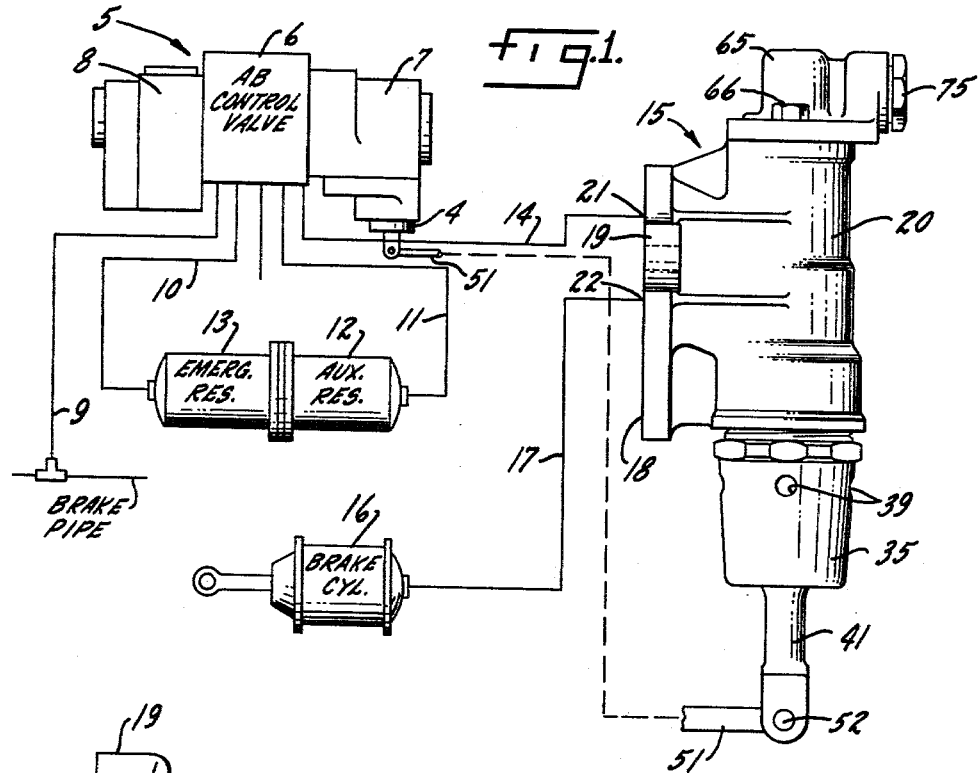
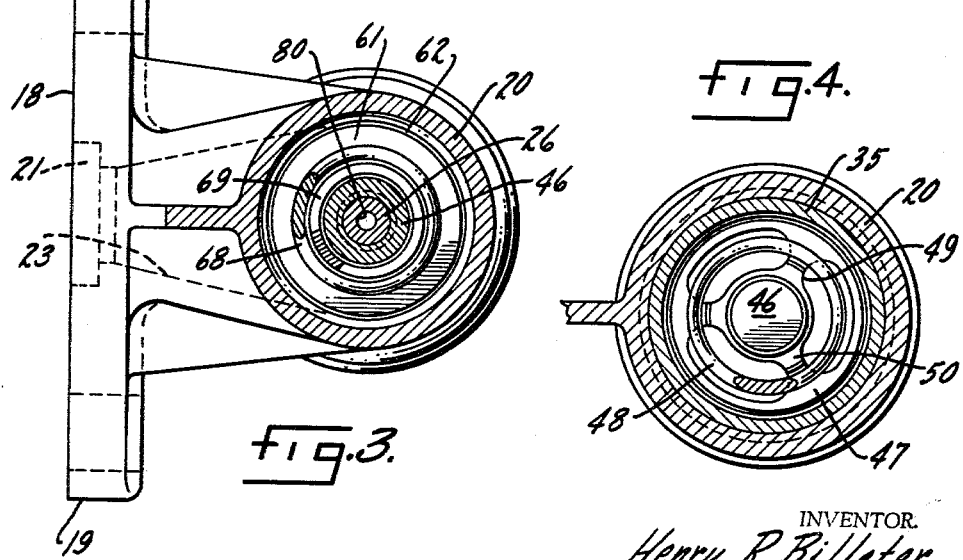
INVENTOR.
Henry R. Billeter,
BY Parker & Carter
Attorneys.

April 6, 1965  H. R. BILLETER  3,177,043
BRAKE CYLINDER RELEASE VALVES
Filed Nov. 29, 1963  2 Sheets-Sheet 2

INVENTOR.
Henry R. Billeter,
BY Parker & Carter
Attorneys.

United States Patent Office 3,177,043
Patented Apr. 6, 1965

3,177,043
BRAKE CYLINDER RELEASE VALVES
Henry R. Billeter, Deerfield, Ill., assignor to Sloan Valve Company, Chicago, Ill., a corporation of Illinois
Filed Nov. 29, 1963, Ser. No. 326,663
10 Claims. (Cl. 303—69)

This invention relates to brake cylinder release valves for railway cars and in particular, to brake cylinder release valves for connection between the well known AB control valve and the brake cylinder controlling the braking of the car wheels. The purpose of the brake cylinder release valve is to conserve the air pressure in the emergency and auxiliary reservoirs while venting the brake cylinder to permit release of the car brakes whenever a car is cut out of a train. The release valve makes it possible for the brakes to be manually released by exhausting the air from the brake cylinder without loss of pressure in the reservoirs so that when a car is again assembled in a train, it is immediately ready to operate without waiting for the build-up of air pressure in all the reservoirs of the cars in the train, thereby conserving air pressure, eliminating recharging of the entire brake system, and a saving of time, as well as wear and tear on the equipment.

The principal object of the invention is to provide a new and improved brake cylinder release valve for the foregoing purpose which is reliable in operation, simple in construction, has long service life, and is relatively free from maintenance.

Another object is the provision of a new and improved brake release valve having a relief valve therein actuated upon manual operation of the brake release valve to quickly exhaust the air pressure from the top side of the piston to atmosphere and to enable reservoir air pressure below the piston to hold the brake release valve in brake release position.

Another object of the invention is to provide an arrangement in a brake cylinder release valve in which the valve is reset automatically in case it is manually tripped at a time when the reservoir pressure is less than a predetermined minimum pressure as would be the case during an unintentional or partial service application of the brakes as would occur on a grade for instance.

Another object is to provide a brake cylinder release valve which will remain in its actuated position in the event the reservoir pressures are more than a predetermined amount when the valve is tripped, to prevent the reservoir air from flowing into the brake cylinder during regular service brake applications.

A further object is to provide a new and improved brake cylinder release valve having novel features of construction, operation and ease of assembly.

A preferred embodiment of the invention is illustrated in the accompanying drawings in which:

FIGURE 1 is a side view of the improved brake cylinder release valve together with diagrammatic illustrations of certain parts of a train brake system;

FIGURE 3 is a cross-section taken along the line 3—3 of FIGURE 2; while

FIGURE 4 is a cross-section taken along the line 4—4 of FIGURE 2.

Figure 2:
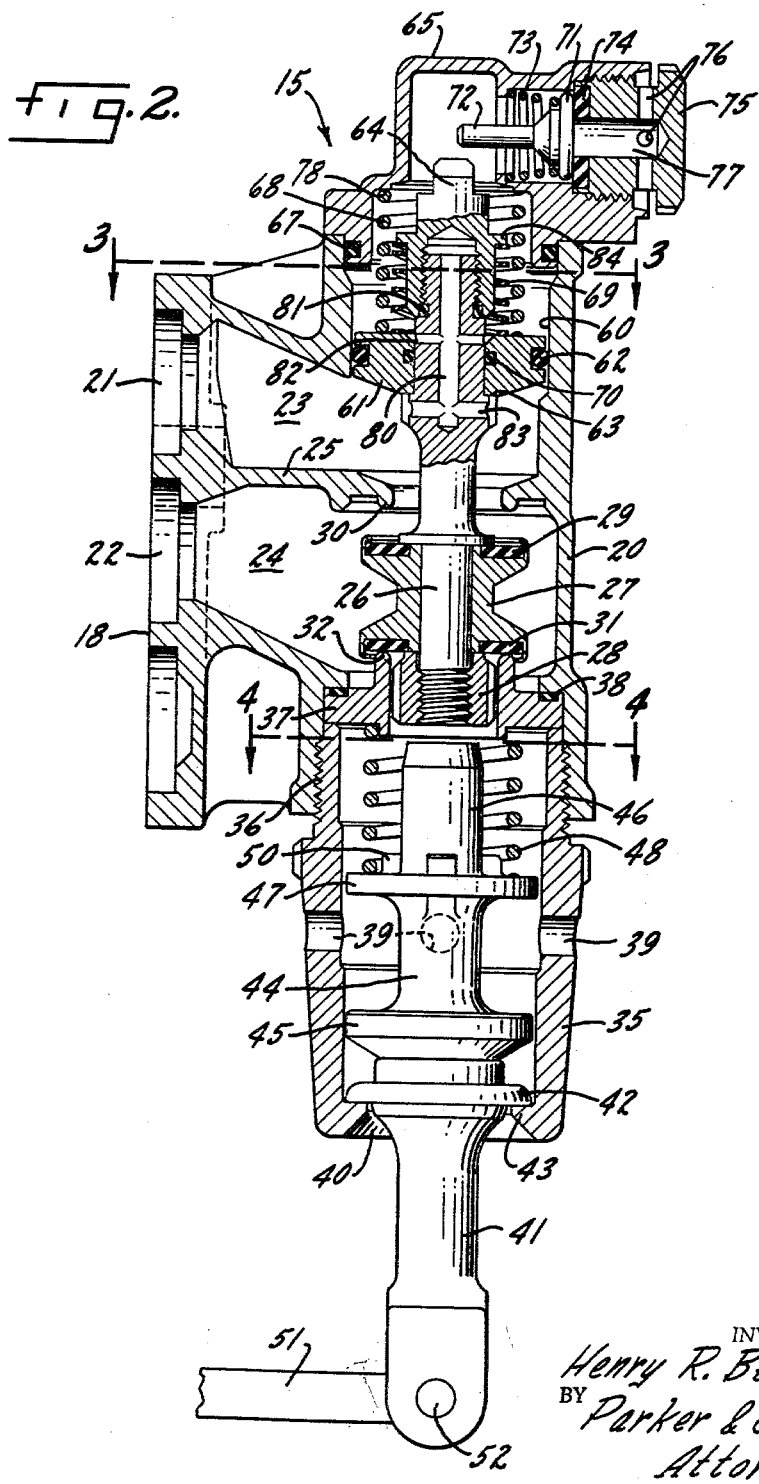
FIGURE 2 is a cross-sectional side view of the improved brake cylinder release valve.

This application is an improvement on applicant's prior Patent No. 3,145,064, filed October 16, 1962, issued August 18, 1964.

As shown in FIGURE 1, the brake apparatus is arranged to be mounted on a railroad car and consists of a brake controlling mechanism indicated generally at 5, such as the well-known AB control valve having pipe bracket portion 6, a service portion 7, and an emergency portion 8. The usual reservoir bleed or duplex valve is indicated at 4, together with its operating tie rod. The AB control valve 5 is supplied with air pressure through the train brake pipe 9. Leading from the pipe bracket 6 are pipe connections 10 and 11 to the auxiliary reservoir 12 and emergency reservoir 13, respectively. The brake cylinder connection 14 extends from the pipe bracket 6 to the brake cylinder release valve indicated generally at 15. The brake cylinder 16 is connected by pipe 17 to the release valve 15. In the preferred arrangement, the release valve 15 is usually mounted upon the pipe bracket side 6 of the AB control valve 5, for example against the flat surface 18 and by means of the ears 19 provided with bolt holes, as seen best in FIGURE 3.

Referring to FIGURE 2, the brake cylinder release valve 15 comprises a central casing or body portion 20 having a side opening 21 to which the AB valve connection 14 is suitably secured and a second opening 22 to which the pipe leading to the brake cylinder 16 is connected. The inlet opening 21 leads into the pressure chamber 23 while the outlet opening 22 leads into the outlet chamber 24. A partition 25 divides the two chambers. The casing 20 is centrally bored to provide for the piston and valve assembly, including supporting stem 26 having the double acting valve member 27 clamped on the lower end of the stem by a nut 28. Valve member 27 is provided with a valve seating washer 29 arranged for seating engagement with upper valve seat 30 in partition 25, and a lower valve seating washer 31 normally in engagement with the lower valve seat 32. The valve seats 30 and 32 are arranged in axial alignment with the double acting valve member 27 between them. At the bottom end of casing 20 there is positioned a socket member 35 which is threaded at its upper end at 36 to the casing 20. A collar 37 carrying valve seat 32 is clamped by socket 35 against the bottom of the casing 20 and a leak-proof sealing washer 38 is arranged on top of collar 37, as shown.

The socket 35 has a series of openings 39 in its sides and an axial opening 40 at its bottom through which a manual operable release lever or rod 41 projects. A collar 42 resting on shoulder 43 retains the lever 41 in depending position from the bottom of the release valve. Release lever 41 is connected to the usual manual operating rod 51 at its lower end 52, so as to enable the rod 51 to tilt the lever 41 when the rod is pulled. Within the socket 35 there is arranged a cylindrical plug 44 with the lower end 45 abutting the end of lever 41 and the upper end 46 being spaced slightly from the bottom end of the stem 26. A collar 47 on plug 44 serves as a support for one end of restoring spring 48, the upper end of which engages the collar 37. Spring 48 normally urges the plug 44 downward in socket 35 and also maintains the lever 41 tensioned in its vertical position as shown. The collar 47 is provided with a series of air passages 49, together with reinforcing ribs 50 between the passages, as best seen in FIGURE 4.

The brake cylinder release valve 15 is arranged at its top end with a cylinder 60 in which the piston 61 is adapted to travel. O-ring packing 62 seals the piston in the cylinder 60. Piston 61 has limited slidable movement on stem 26 and is normally held against shoulder 63 formed on stem 26, by the springs 68 and 69. An O-ring 70 seals the sliding fit between the stem 26 and piston 61. The reset spring 68 has a value of 5 pounds while the control spring 69 has a value of 40 pounds. Therefore, these springs will exert their stated ratings when such pressures are present in the chamber 23 and below the piston 61. The top end of stem 26 has a bushing 64 threaded thereon closing off a center bore 80 through the top of the stem. Packing 81 seals off the threaded connection between the bushing 64 and stem 26. The piston 61 is normally positioned on stem 26 between two cross bores 82 and 83 which communicate with the stem bore 80, so that in the normal position of the piston 61 as shown in FIGURE 2 free access of air pressure to the upper side of the piston from the chamber 23 through the bores, is made possible. The bushing 64 has a collar 84 formed on it against which one end of control spring 69 abuts, the other end pressing against the top of the piston 61.

At the top end of casing 20 there is a hollow cover 65 secured thereto by bolts 66 and sealed by O-ring 67 in the cylinder 60. The hollow cover 65 supports a relief valve member 71 having a stem 72 extending laterally into close proximity of the end of bushing 64 whereby stem 72 is adapted to be tilted whenever bushing 64 is projected in an upward direction. Spring 73 around stem 72 and under valve member 71 serves to restore the relief valve and stem to normal position after each operation. The valve seat for the relief valve 71 is indicated at 74 and is supported in a headed plug 75 threaded horizontally into the cover 65. Perpendicular passages 76 and horizontal passage 77 lead to atmosphere from the closed side of the relief valve 71. Reset spring 68 has its upper end in engagement with shoulder 78 in cover 65 so it exerts its restoring action against the top of piston 61 at the other end of the spring.

In the operation of the device, assume the brake equipment shown in FIGURE 1 to be fully charged with air under pressure, the AB control valve 5 to be in brake release position, and the brake cylinder release valve 15 to be in its normal or service position, as shown in FIGURE 2. Under these conditions and with the train under way, the brake cylinder 16 will be connected directly to the AB control valve by way of pipe 17, port 22 and chamber 24, of the brake cylinder release valve 15, through valve seat 30, chamber 23, port 21 and pipe 14 to the pipe bracket 6 of the AB control valve. The passage for air between the brake cylinder 16 and the AB valve 5 is thereby complete so the engineer is able to control the train and apply the brakes in the usual manner, the same as if the brake cylinder release valve were not interposed. The brake cylinder release valve is held seated downward in the normal running position by virtue of the presence of air pressure in chambers 23 and 24, the differential pressure on top of the valve member 27, and atmosphere on the bottom, together with the downward tension exerted by restoring spring 68 and the pressure on top of the piston 61. These forces are sufficient to hold the valve member 27 closed down tight on its lower seat 32 under the foregoing conditions. Communication between the AB control valve and the brake cylinder is thereby maintained and the brakes can be operated in the normal manner.

Under the above circumstances, changes in pressure of the air in the train pipe brought about by the engineer so as to cause the AB control valve to control brake operation, do not in any way upset the position of the release valve. The release valve maintains a clear passage for air between the AB control valve and the brake cylinder. When the air pressure is released entirely from the train brake pipe 9, as when a car is cut out of a train, the release valve remains in its set position, permitting continued brake holding application by the AB control valve of the air under pressure in the reservoirs.

When it is desired to bleed off the air and release the brakes on the switched car, the brakeman manually actuates lever 51 momentarily to tilt the handle 41 in any chosen direction to force the plug 44 upward against the tension of restoring spring 68 and the AB pressure in chambed 23. The end 46 of plug 44 thereby contacts the lower end of stem 26, resulting in the forceful upward movement of the stem 26 and the opening of the air release seat 32 and closing of holding seat 30 by valve member 27. This action exhausts the air pressure immediately from the brake cylinder 16 via chamber 24, release seat 32, downward through the openings 49 in plug disc 47 and to atmosphere through the openings 39 in socket 35. The brakes are thereby released in the usual manner.

Again as a further result of the upward movement of valve stem 26, and a short time before the valve seat 30 is closed, the bushing 64 contacts the relief valve stem 72 and tilts it upward. The tilting of relief valve 71 off its seat 74 permits a complete and rapid exhaustion of the air pressure from above the piston 61, through relief valve seat 74 and passages 76 and 77 to the atmosphere. When this occurs, the pressure on top of piston 61 being completely released at this time, the valve member 27 is quickly and smoothly closed upon its upper seat 30 and remains in this set position as long as the car is disconnected from the train.

As a further result of the closing of valve seat 30 by valve member 27, the passage 24 and port 22 to the brake cylinder 16 from the AB valve, is completely closed and escape of air through seat 30 from the emergency and auxiliary reservoirs 12 and 13, is thereby prevented. There is therefore no possibility of air being lost from the reservoirs while the car is not connected up with the train, but when the car is again connected in a train, it is ready to operate without waiting for build up of air pressure in the reservoirs.

With the closure of valve 29 on the upper seat 30, the AB air pressure which is normally above 40 pounds or more is trapped in chamber 23 to prevent loss from the reservoirs. The underside of piston 61 is also subject to this pressure and as soon as valve seat 30 is tightly closed (by actuation of handle 41) the air pressure under piston 61 forces it to slide upward on stem 26 from its resting position on shoulder 63, against the tension of control spring 69. In sliding upward the piston closes off the bores 82 thereby preventing escape of air from chamber 23 through bores 83, 80 and 82. The pressure on the lower surface of the piston now holds the brake release valve in its upward position closing off valve seat 30.

The valve member 27 and stem 26 remain held in the foregoing upward position even after the handle 41 is released and restored by spring 48, because the pressure now present in chamber 23 on the underside of piston 61 is present over a greater pressure area than that on top of the valve member 29 within the area of its closed seat 30. Thus the reservoir air pressure holds the release valve in the brake cylinder release and reservoir closing position against the tension of spring 68. With the brakes released, the car can then be moved but no further air is lost and further manipulation of the handle 41 can have no effect on the brake release valve. The reservoirs 12 and 13 retain their pressures while the brake cylinder 16 is completely exhausted so the brakes are in released position.

In the event that air pressure in chamber 23 is 30 pounds or less, at the time the brake release valve is manually tripped by handle 41, the valve will automatically be reset when the handle is released, and the clear air passage between the reservoir air and the brake cylinder is thereby maintained. Such reduction in air pressure in the chamber 23, would take place under conditions of partial or light brake applications as would occur when a train is going down a grade or if the handle 41 were unintentially operated or leakage existed in the air delivery pipe and when the AB control valve goes into release positions. Under the aforesaid conditions, the piston 61 would be unable to hold up on stem 26 against the 40 pound control spring 69 with the result that the air passages through bores 80, 82 and 83 would be opened permitting the escape of air from chamber 23 through the relief valve 71 to atmosphere. The reset spring 68 would then be effective to force the piston 61 downward along with the valve stem 26, and opening valve seat 30 when the handle 41 is released.

If at the time the brake release valve is tripped and the reservoir pressures are at 40 pounds or more, and then for the reasons stated a gradual leakage should occur to drop the pressure to 30 pounds, the control spring 69 would be effective to force the piston 61 downward against shoulder 63 on stem 27 without however forcing valve stem 27 downward to open valve seat 30. The downward movement of piston 61 opens ports 80, 81 and 83 permitting escape of reservoir air pressures to atmosphere above the piston and through the tilted air valve 71. The valve 27 remains closed on seat 30 until the pressure have dropped to the value of about 10 pounds whereupon the reset spring 68 will become effective to exert its force downward upon the top of piston 61 and stem 26, thereby opening valve seat 30 and resetting the brake release valve.

When a car is replaced in a train and pipe pressures are restored, the AB control valve assumes its release position. This reduces the reservoir pressure in chamber 23, thereby permitting the restoring spring 68 to exert its stored energy against the top of piston 61, restoring the stem 26 and valve member 27 downward to normal position. As a result, the valve seat 32 is now closed while valve seat 30 is open, permitting a clear passage between the chamber 23 and 24, so that the AB control valve again has control of air pressures to the brake cylinder 16 for brake application. The brake release valve is now held in the above position by spring 68, and any further action by the AB valve in its operation will have no effect upon the position of the brake release valve.

The invention is applicable for use with a common actuating rod connecting together the brake cylinder release valve 15 and the reservoir bleed or duplex valve 4. The common actuating rod 51, shown in FIGURE 1, can be hand operated and held by the brakeman to fully deplete the emergency reservoir 13 and the auxiliary reservoir 12, as well as the brake cylinder 16 under certain conditions such as when the brakes become locked or the reservoirs are overcharged. However, if the brakeman desires to release the car brakes only and maintain the reservoirs almost fully charged, he gives only a momentary pull on the rod 51 which operates the brake cylinder release valve with practically no loss of air from either the auxiliary or emergency reservoirs, since the duplex valve 4 will immediately reclose when the pull rod 51 is released. Under these conditions, the piston 61 is snapped upwardly to immediately trip the relief valve 71 and exhaust the air pressure from the top of the piston which occurs much more rapidly than the air pressure can exhaust from chambers 23 and 24 of the release valve. The relief valve 71 exhausts the pressure from the top of the piston very rapidly to maintain the valve seat 30 closed during the momentary drop in pressure in chamber 23 as the reservoirs are being slightly depleted. This action maintains the differential across the piston against the action of spring 78 and since the reservoir pressure in chamber 23 is above 40 pounds, the piston is also forced up on stem 26 against spring 69 to close off the air passages or ports 82.

It is therefore seen that with the brake cylinder release valve constructed according to the present invention, a number of desirable advantages are secured. The time necessary to bleed and then to recharge the brake system of a train is greatly reduced. The valve when actuated automatically exhausts only the pressure in the brake cylinder to the atmosphere, and at the same time conserves the air in the reservoirs. Both the time loss in manually bleeding and then recharging each individual car is eliminated while the air usually lost in manual bleeding is conserved.

The preferred embodiment has been described in some detail, however, the invention is not to be limited to the particular embodiment illustrated but only to the scope of the appended claims.

What is claimed is:

1. In a brake cylinder release valve, a casing having a connection with a brake control valve and a connection with a brake cylinder, a valve stem in said casing having a double acting valve member on one end and a piston slidable in said casing on the other end, a valve seat in said casing opened by said valve member to permit free passage of air pressure from said brake control valve to said brake cylinder, a spring on said valve stem biasing said valve member in said open position, manual operated means in said casing for actuating said valve stem to move said valve member to close on said valve seat and disconnect the air pressure from said brake cylinder while retaining the air pressure from said brake control valve, said retained air pressure being effective on one side of said piston opposed to said spring to hold said valve stem and valve member in actuated position after said manual operating means is released, and air passage means in said valve stem extending from said brake control passage below said piston to an exhaust position above said piston, said air passage means controlled by said piston independently of the movement of said valve stem for controlling the passage of air therethrough depending upon the pressure thereof.

2. In a brake cylinder release valve having a casing connected between a brake control valve and a brake cylinder, a main valve stem having a double acting valve member on one end and a piston on the other end, a pair of spaced apart valve seats adapted to be alternately closed and opened by said valve member to control air pressures between said brake control valve and said brake cylinder, manual operated means adapted to engage one end of said valve stem to shift said valve member from one of said valve seats to the other, said main valve stem being vertically disposed for operation by said manual operated means, spring means for restoring said valve stem and shifting said valve member back to said first valve seat, said piston being at times subject to air pressures on the bottom and top sides thereof, and means on said valve stem controlled by said piston for controlling the passage of air pressure from one side of said piston to the other, said means comprising air passages in said valve stem extending from one side of said piston to the other, a shoulder on said stem and a spring for normally urging said piston against said shoulder, said piston arranged to move upwardly on said valve stem to close said air passages against said spring pressure responsive to a predetermined pressure valve on the bottom side of said piston.

3. In a brake cylinder release valve, a casing having a connection with a brake control valve and a brake cylinder, a main valve stem vertically disposed in said casing and having a valve member on one end and a piston on the other end, a valve seat for said valve member, said valve member controlling passage of air pressure between said brake control valve and said brake cylinder, manually operated means on the bottom of said casing adapted to actuate said main valve stem and move said valve member to close said valve seat, said piston subjected to air pressures on the top and bottom sides thereof from said brake control valve, a relief valve for releasing air pressure from the top of said piston when said main valve stem is actuated, said valve stem having air passages therethrough extending from one side of said piston to the other, said piston having limited movement on said valve stem independent of the movement of said valve stem, for controlling the opening and closing of said air passages, spring means for moving said piston on said valve stem to open said air passages when the air pressure below said piston reaches a predetermined value, and spring means for moving said valve stem to open said valve seat when air pressures are exhausted to atmosphere through said air passages and said relief valve.

4. In a brake cylinder release valve, a casing having an air pressure connection leading to a brake control valve and another connection to a brake cylinder, a main valve stem in said casing having a double acting valve member on one end thereof and a piston on the other end, opposed valve seats for said valve member, the upper one of said valve seats controlling passage of air pressure from said brake control valve to said brake cylinder and the lower one of said valve seats controlling release of air pressure from said brake cylinder to atmosphere, a manually operated lever in said casing adapted to contact the bottom end of said main valve stem to actuate it upward and shift said valve member from its lower seat to its upper seat, said piston being exposed to air pressure on its underside from said brake control valve when said valve member is seated on said upper seat to hold the same seated thereon, a spring on said valve stem for restoring said valve stem and valve member when the air pressure below said piston is reduced, said valve stem having air passages extending therethrough from one side of said piston to the other, said piston having limited movement on said valve stem to control the opening and closing of said air passages, said piston movable on said valve stem to close said air passages responsive to air pressures above a predetermined amount to hold said valve member closed on its seat, and said piston movable to open said air passages responsive to air pressures below said predetermined amount to exhaust said air pressures to atmosphere.

5. In a brake cylinder release valve for controlling air pressure between a brake control valve and a brake cylinder, a casing having a main valve stem vertically disposed therein with a double acting valve member at one end and a piston on the other end, manual means for actuating said valve stem upwardly to shift said valve member from one seat to another, a main spring means for restoring said main valve stem, means in said casing for balancing air pressures from said brake control valve to both sides of said piston, and means for releasing air pressure from one side of said piston when said valve stem is manually actuated, said last means comprising a relief valve horizontally disposed and having a relief valve stem arranged opposite the upper end of said main valve stem in operative relation thereto and adapted to be tilted thereby, said piston having limited independent movement on said valve stem, said valve stem having air passages therein extending from one side of said piston to the other and adapted to be opened and closed by the movement of said piston on said valve stem, spring means on said valve stem for controlling said piston to hold said air passages closed responsive to air pressures above a predetermined value, and permitting said piston to open said air passages responsive to air pressures below said value, whereby said air pressures are exhausted to atmosphere through said relief valve, said main spring means being thereby effective to restore said valve stem.

6. In a brake cylinder release valve, a casing having an air pressure connection leading to a brake control valve and another connection to a brake cylinder, a main valve stem in said casing having a valve member on one end thereof and a piston loosely arranged on the other end, opposed valve seats for said valve member, the upper one of said valve seats controlling passage of air pressure from said brake control valve to said brake cylinder and the lower one of said valve seats controlling release of air pressure from said brake cylinder to atmosphere, a manually operated lever in said casing adapted to contact the bottom end of said main valve stem to actuate it upward and shift said double acting valve member from its lower seat to its upper seat, said piston being exposed to air pressure on its underside from said brake control valve when said valve member is seated on said upper seat to hold the same seated thereon, said valve stem having air passages therein, extending from one side of said piston to the other, said piston having limited sliding movement on said valve stem to open and close said air passages, said piston closing said air passages when a predetermined air pressure is present below said piston, to hold it up, a spring between the valve stem and piston for opening said air passages when the air pressures present below said piston reaches a lower value, the opening of said air passages resulting in the exhaustion of the air pressure below said piston to atmosphere above said piston, and a second spring between said piston and said casing for restoring said valve stem and opening the upper one of said valve seats after the air pressure has been entirely exhausted.

7. The brake cylinder release valve as claimed in claim 6 in which the first spring has a value of about 40 pounds and the second spring a value of about 5 pounds.

8. The brake cylinder release valve as claimed in claim 6 in which the piston holds the air passages closed until the air pressure below the piston drops to about 30 pounds after which the spring moves the piston to open the air passages, and when the air pressures drop to about 5 pounds, the main spring is effective to reset the valve stem and close the valve member on its lower seat.

9. In a brake cylinder release valve having a valve member for controlling passage of air from an AB control valve to the brake cylinder, a valve stem having air passages extending therethrough and supporting said valve member, a piston on said valve stem arranged between said air passages and having upward sliding movement on said valve stem independently thereof, the movement of said piston controlling passage of air through said air passages from one side of said piston to the other, spring means between said valve stem and said piston for restoring said piston, and other spring means between said piston and the release valve casing for restoring said valve stem and valve member, said piston arranged to move upwardly on said valve stem to close said air passages against said first spring means responsive to a predetermined pressure value on one side of said piston.

10. The brake cylinder release valve defined in claim 9 in which the first of said springs is effective to restore said piston when the air pressure below the piston is reduced to 30 pounds, and the second spring is effective to restore the valve stem and valve member when the air pressure is reduced to 10 pounds.

References Cited by the Examiner
UNITED STATES PATENTS 2,735,726   2/56   Klingler et al.     303—68
3,145,064   8/64   Billeter et al.     303—69

EUGENE G. BOLTZ, *Primary Examiner.*